INVENTOR
ERIC E. METZGER

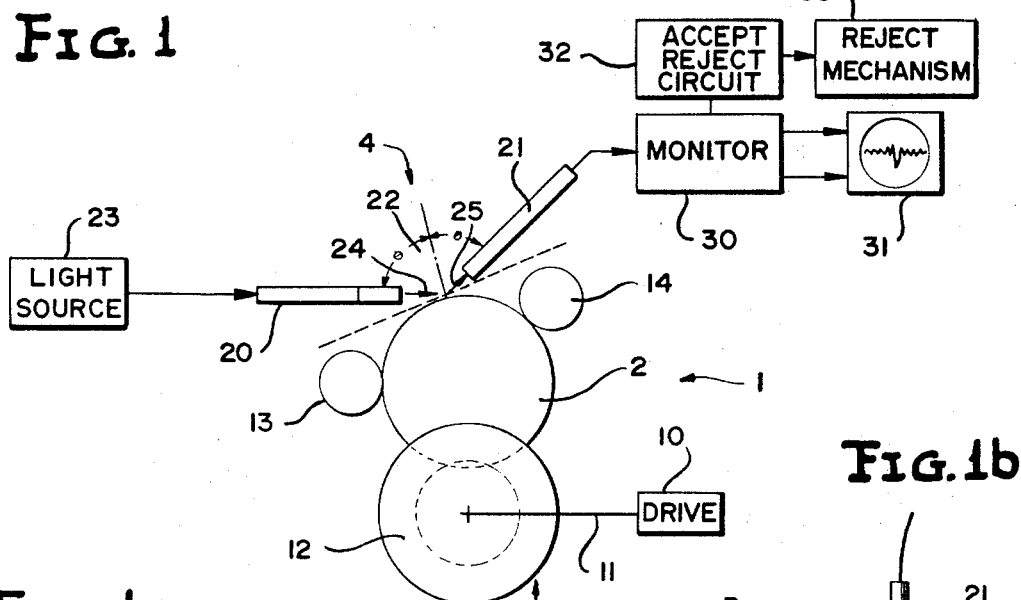
FIG. 1
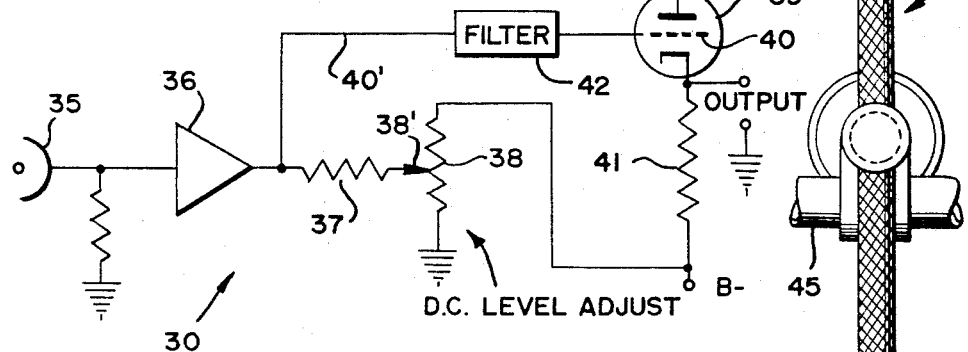
FIG. 1a
FIG. 1b
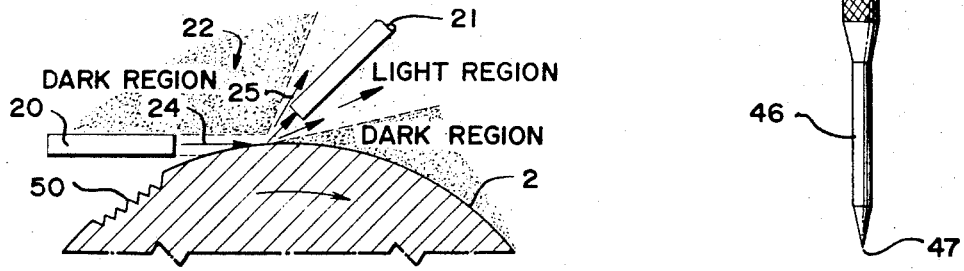
FIG. 2
INVENTOR
ERIC E. METZGER

BY *Hurvitz & Rose*

ATTORNEYS

United States Patent Office 3,430,055
Patented Feb. 25, 1969

---

3,430,055
SURFACE FLAW DETECTOR
Eric E. Metzger, Silver Spring, Md., assignor to Bowles Engineering Corporation, Silver Spring, Md., a corporation of Maryland
Filed Apr. 2, 1965, Ser. No. 445,082
U.S. Cl. 250—219                                        14 Claims
Int. Cl. G01n 21/32, 21/48; G02b 5/14

ABSTRACT OF THE DISCLOSURE

A surface flaw detector wherein a fiber optic element is positioned adjacent a moving surface being inspected to receive reflected light therefrom and transmit the received light to a photosensitive device. A source of light in the form of a collimated light beam is directed to impinge upon the moving surface. The field of view of the fiber optic receiver element is approximately the size of the smallest surface flaw to be examined and, in a preferred embodiment, the receiver is disposed so as to normally receive a portion of the light reflected from the examined surface. When a flaw in a moving surface traverses the impinging collimated beam the receiving fiber experiences first a reduction in the intensity of received light followed immediately by a relatively large increase and finally another reduction in the intensity of received light.

---

The present invention relates to a surface inspection device and, more particularly, to an inspection device for detecting and interpreting surface flaws in roller bearing components and the like.

During the manufacture of bearing assemblies, several checking operations are required to insure that the rollers, balls and races are free of flaws that might damage or weaken the structure and thus shorten the life of the assembly. The flaws that appear on the finished components are of various types, often appearing as minute cracks or pits which can originate either in the pressing process or during the grinding process. Prior to this invention, the standard for the surface finish inspection and testing of balls and races has been stated in terms such that balls and races with faults that can be observed by the human eye in diffused light must be rejected.

With this standard in mind, most prior art inspection methods are carried out visually by human observers. Usually a large number of products or components are observed at one time, while being turned by machines to enable gradual inspection of the entire surface of the product. Such procedures inevitably result in a variable standard, depending on time of day, day of the week, and so forth. In search of more reliable and cheaper inspection methods, automatic machines have been developed with photoelectric cells that observe a part of the ball surface which is illuminated by a suitable light. The reflected light is received by the cell, a fault being indicated by a reduction of the average reflected light flux due to the random scattering of the light beam by the rough surface of the fault. When a fault is indicated, the ball is automatically rejected by the machine.

While the above-mentioned machine operates satisfactorily with products with flaws or faults which can be observed in diffused light by the naked eye, its sensitivity to minute imperfections is limited. More particularly, the indicated machine is incapable of sensing flaws in the range of 0.003 inch so that products with these sizes are passed as being free of faults.

According to the present invention, a device is provided that has greatly improved sensitivity over the prior art devices, and can detect flaws of the order of 0.003 inch. The present apparatus is also characterized by a degree of adjustability of the discrimination level for detecting flaws over a range of sizes. For example, a system designed for detection of 0.003 inch flaws has successfully examined flaws from 0.002 to 0.090 inch by appropriate adjustment of the supporting electronics. Further, the present machine affords a very high scanning rate to afford rapid readout and rejection of faulty products. Also, with the present apparatus, it is possible to examine more subtle variations in the surface than was heretofore possible due to the improved signal-to-noise ratio that is obtained.

In the preferred embodiment of my invention, I provide a fiber optic element adjacent the surface to be inspected to receive reflected light from the surface; the change in the light flux being received by the fiber serving as an indication of the presence and extent of a surface imperfection. Contrary to prior art devices, advantage is taken of an increase in light flux or a favorable reflection rather than a decrease in light flux to provide the signal pulse for flaw interpretation. More particularly, I have discovered that, if a collimated light beam (formed by a fiber optic element, for example) is directed toward the moving surface being inspected, large increase in light can be detected by a fiber optic element whose aperture size is appropriately sized relative to the size of the flaw desired to be detected. In many cases, I have found that if the fiber optic element used to detect the level of illumination from the light source is approximately the size of the smallest flaw to be examined, then the fiber receives first a reduction of light, followed immediately by a relatively large increase in light and finally a subsequent reduction in light. This particular arrangement gives an electrical signal, which is greatly enhanced over what it would be if a single reduction in light flux due to the random reflection of light by the flaw is relied upon, as in the prior art. If the fiber is somewhat larger than the size of the flaw as in the prior art, the change in light detected by the fiber is small since only a small portion of the total light reaching the fiber is affected by the flaw. That is, the light is increased or decreased by a factor of 100% to only one-half of the fiber optic, then the signal is only one-quarter greater. In other words, if a flaw is of one-half the diameter of the fiber, the flaw affects one-fourth of the light reaching the fiber, and such a small change in light flux is not easily detected.

With the present invention, substantially all of the light reaching the fiber optic has been affected by the flaw giving a signal that is very easy to detect. Further, the supporting electronics is such as to permit adjustment of discrimination amplitude so that the apparatus responds to signals in a predetermined amplitude range and consequently, responds to signals generated by flaws in a predetermined size range.

Further, because of the nature of certain flaws, when the fiber is of approximately the size of the smallest flaw to be detected, as taught by the present invention, the apparatus is capable of detecting two shadows caused by the flaw edges and a favorable reflection of light from the sides and bottom of the depressed flaw between the edges to provide an even more enhanced overall pulse amplitude and signal-to-noise ratio.

Thus, the apparatus of the invention provides rapid evaluation of a surface to be inspected and accurate discrimination of flaw size.

Accordingly, it is one object of this invention to provide an inspection device for detecting flaws in material.

It is an object of this invention to provide a flaw detector capable of rapidly and accurately detecting and interpreting flaws of minute size.

It is another object of this invention to provide a flaw detector with improved sensitivity and signal-to-noise ratio.

It is still another object of this invention a surface flaw detector that is capable of rapidly and accurately detecting and interpreting flaws in range from about .001 inch to .100 inch.

A further object of this invention is to provide a flaw detecting device that utilizes an energy receiving means that is substantially the same size as the flaw being detected whereby the output pulse amplitude is enhanced due to the increased percentage of light affected by the flaw and/or due to the sensing of a successive series of flux level changes.

Still a further object of this invention is to provide a surface flaw detector with a fiber optic element having a fiber diameter of about the size of the smallest flaw to be detected whereby shadow regions and favorable scattering of light by the flaw are not lost in the general light level and thus produce an enhanced electrical pulse output signal indicating the presence of a flaw.

An additional object of the present invention is to provide a flaw detector of the type described wherein the discrimination level is established by the size of the optic fiber aperture and by the supporting electronics, which level can be easily adjusted to any desired range of flaw sizes to be detected.

The above and still further objects, features and advantages of the present invention will become apparent upon consideration of the following detailed description of one specific embodiment thereof, especially when taken in conjunction with the accompanying drawings, wherein:

FIGURE 1 is a schematic illustration of the flaw detector apparatus of the present invention;

FIGURE 1a is a schematic illustration in block form of a portion of the electronic components of the apparatus shown in FIGURE 1;

FIGURE 1b is a detailed view of the fiber optic jacket and support of the apparatus of FIGURE 1;

FIGURE 2 is a diagrammatic illustration of the light pattern generated in the present device where no surface flaw is intercepted by the light beam.

Figure 3:
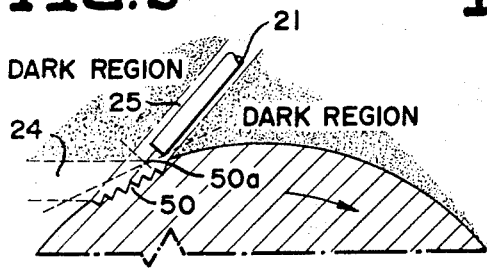
FIGURE 3 is a diagrammatic illustration of the light pattern generated in the present apparatus where the light beam is favorably reflected by the flaw.

The basic system of the present invention is illustrated in FIGURE 1, which includes for illustrative purposes, a drive means for moving the surface to be inspected. In this case, a ball bearing 1 having a surface 2 to be inspected is supplied; it being understood that other types of surfaces can be inspected with appropriate means being supplied to present them to the inspection station. A drive unit 3 is such that, as is explained, subsequently, the entire surface 2 is presented to a flaw detector constructed in accordance with the present invention, said flaw detector being generally designated by the reference numeral 4. As previously indicated, it is a purpose of the present invention to detect and interpret minute cracks or pits in the surface 2. In order to obtain this result, the ball 1 is rotated in a zonal or meridianal pattern by the conventional drive means 3 which is now described.

As shown, the drive means 3 consists of a rotational drive unit 10 having a drive shaft 11 connected to a pair of truncated tapered rollers 12 (only one of which is shown in FIGURE 1). The surface 2 is supported by the rollers 12 with the help of a pair of pressing rollers 13, 14; the ball 1 being frictionally driven at a high speed around the horizontal axis and at the same time being driven at a low speed around the vertical axis in a manner well known to those skilled in this art. In consequence, within a specified time period, the entire surface 2 of the ball 1 is presented to any arbitrarily selected location in space for inspection at that location. After the ball 1 has been inspected, it is automatically released and is mechanically accepted or rejected in accordance with the signals received from the inspecting means 4; however, since this accepting and rejecting mechanism forms no part of the present invention, it will not be described or illustrated in detail here. Suffice it to say that such mechanisms are well known in the art and are controlled in response to the inspecting means of the present invention, now to be described.

Referring still to FIGURE 1, there is illustrated a pair of fiber optic elements or devices 20, 21, which define an inspection station, generally repersented by the reference numeral 22. A light source 23 supplies a collimated incident beam of light to the inspection station 22, via the optical fiber 20, said incident beam of light being generally represented by the arrow 24 in the figure. It should be noted that while the optical fiber 20 is selected to deliver the light beam to the inspection station 22, other well known methods of supplying collimated light may be utilized according to the present invention, if desired. In any case, the use of collimated light in accordance with the present invention greatly improves the definition of the final output signal of the inspecting device 4, since unneeded light rays which tend to increase the background noise level at the receiving fiber 21 are advantageously eliminated. With the elimination of the unneeded and thus, detrimental rays of light, the overall signal-to-noise ratio of the device is improved.

The fiber optic 21 receives the reflected light beam from the surface 2 of the ball 1, the light beam being designated by the arrow bearing the reference numeral 25. The quantity of light energy picked up by the fiber 21 varies with the condition on the surface 2 and thus is indicative of the flawed condition on the surface 2 of the ball 1, as previously described. The circuitry which is responsive to the light energy received by the fiber to indicate the presence or absence of a flaw of at least a minimum size includes a monitor circuit 30, an oscilloscope 31 for visual readout, an accept-reject circuit 32 responsive to said monitor 30 and a reject mechanism 33.

The monitor 30 is or may be of the type illustrated in FIGURE 1a consisting of a photoelectric cell 35, an amplifier 36, an amplitude discriminator 37, with potentometer 38 and a power output tube 39. The output voltage of amplifier 36 is applied over lead 40' to grid 40 of the power output tube 39 having its anode connected to B+ and its cathode connected through resistor 41 to B—. A negative bias voltage is applied to the grid 40 of the tube 39 via the lead 40' to which is connected one end of a resistor 37. The other end of the resistor 37 is connected to a slider 38' of a potentiometer having a resistor 38 connected between ground and the B— supply. Thus, by positioning slider 38', the bias of the tube 39 can be adjusted to discriminate against signals below a specified level. Discrimination does not have to occur here, but can occur instead in the accept-reject circuit 32 by using a level sensitive switch such as a "Schmitt" trigger. A high pass filter 42 is sometimes included which will transmit pulses caused by flaws, while rejecting signals due to variations in average surface reflectivity. In the monitor 30, it is to be understood that as the light intensity to the cell 35 decreases, the current to the collector electrode thereof decreases and the voltage thereon rises so as to produce a positive going signal at the grid 40.

The tube 39 is preferably of the sharp cut off type so that the input signal must rise above a specific value to produce conduction of the tube. Signals developed across the resistor 41 may be employed to operate the reject circuit 32 and may be applied to the oscilloscope 31 since this is a high input impedance device and relatively little energy is required from the circuit to which it is connected in this application.

The amplifier 36 may be eliminated if a photomultiplier tube or other type of high gain optical-electrical interface device is employed.

In accordance with the present invention, the light beam 24 arrives at the inspection station 22 with an angle of incidence $\theta$. Generally, good results to date have been obtained if the angle of incidence is approximately 60°. However, acceptable results have been, and may be, obtained with angles that vary considerably from the angle described in the preferred embodiment depending upon the depth and width of flaws to be detected. Generally speaking, for extremely narrow and deep flaws, the angle should be a minimum so that substantially a full view of the flaw is obtained by the fiber elements 20, 21 for maximum response; whereas, for other flaws the angle $\theta$ may be larger which can improve the signal level due to shadowing by the flaw edges, which is an important feature of the persent invention, as will be understood from the discussion of FIGURES 2-6 that follows.

The reflected light beam 25 is reflected from the surface 2 with substantially the same angle of reflection $\theta$ in accordance with well known phenomena. Therefore, the optic fiber 21 is positioned on the opposite side of the inspection station 22 from the optic fiber 20 so that it is appropriately illuminated by the light beam 25.

In FIGURE 1b, there is illustrated a detailed view of the support for the fiber optic element 21 which is mounted on a support arm 45 of a micro-manipulator, to provide indexing for the receiving aperture of the fiber 21. In the preferred embodiment of the invention, a stainless steel jacket 46 is provided to enclose the fiber element and thus impart high strength capability and ruggedness to the assembly. An aperture which is determinative of the size of the fiber optic 20, 21, is generally designated by the reference numeral 47 in the figure. The aperture 47 is provided in one end of the steel jacket 46 and serves to receive and admit the reflected or scattered light to the monitor 30 to be sensed. The end of the assembly with the aperture 47 is positioned by the arm 45 of the micromanipulator at approximately one receiving aperture diameter or width from the surface 2 desired to be inspected so that the fiber element 21 receives the desired reflected light beam at this end. The light signal is transmitted through the length of the steel jacket 46 and thence to the monitor 30, as indicated in FIGURE 1.

Figure 6:
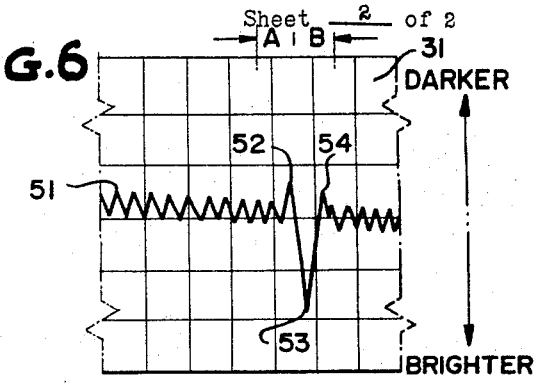
FIGURE 6 illustrates the advantageous pulse pattern generated by the movement of the surface that is inspected past the inspection station as shown in FIGURES 2–5.

Reference is now made to FIGURES 2-6 for an understanding of the specific effect on the reflected light beam 25 caused by the interception of the light beam by a flaw 50 in the surface 2 of the ball 1. In order to explain the manner in which the electrical pulse shown in FIGURE 6 is generated by the flaw 50, let it be assumed that the incident light beam 24 arrives at the inspection section 22 from the left hand side, as viewed in FIGURE 2. Also, let it be assumed that the light beam is collimated by the fiber element 20 so that the width of the light beam 24 is appropriate to the width of the flaw 50 to be detected. By selecting a width for that incident light beam 24 that is approximately equal to the width of the flaw 50, better definition of the reflected light signal received at the fiber element 21 is possible, as previously explained. Further, the size of the aperture 47 of the fiber optic element 21 and its distance from the surface 2 along the path of the reflected light beam 25 is chosen to approximate the size of the flaw 50 desired to be detected. Thus, for example, if the minimum size of the flaw 50 is to be 0.003 inch, then a diameter or width of the aperture 47 of the fiber element 21 and the distance is selected as approximately 0.003 inch also. In this case, the diameter or width of the aperture of the fiber optic element 20 is or may be of the same dimensions.

In FIGURE 2, there is illustrated in diagrammatic form, the nature of the reflection of the incident beam 24 where the surface 2 is smooth and contains no flaws. As is apparent from the illustration, the reflected beam 25 fans out in the region surrounding the fiber element 21 (shown diagrammatically for ease of illustration) so that the end of said element 21 is totally covered with reflected light rays from the curved surface 2. In this case, the fiber element 21 does not receive the total reflected energy since the light region is considerably larger in cross-sectional area than the chosen effective diameter, that is, the aperture of said fiber element 21.

Referring now to FIGURE 3, there is illustrated the case where the collimated light beam 24 intercepts the flaw 50 that is desired to be detected. In this case the reflected beam 25 does not fan out over a large region as in FIGURE 2, but is collimated or favorably reflected in the direction of the receiving fiber element 21. This discovery allows me to take advantage of an increase in light caused by the flaw 50 rather than to depend on a reduction in light flux, as was previously known. This favorable reflection of light along the axis of the receiving fiber 21 can perhaps best be explained by considering the analogy of a tube which has an inside surface that is capable of reflecting light. If a collimated light beam is shined into one end of such a tube at an angle, then the light rays which are emitted from the other end of the tube will be generally aligned along the tube axis due to the generally curved surface. The alignment of the light rays at said other end can be attributed to activity of the light rays being reflected along the inside surface until they are eventually all traveling along said axis of the tube. Similarly, light entering a flaw has been found to emerge generally aligned in a favored direction as a result of the multiple reflections of the light rays along the recessed region. As can be seen, when the light beam 24 is reflected in the manner indicated in FIGURE 3 and thus collimated along the axis of the fiber 21, the amount of light in the beam 25 being received at the receiving aperture 47 is considerably greater than the amount of light being received when the same light beam 24 is fanned out by the curved surface 2, as shown in FIGURE 2.

The concentration of light along the favored path of the beam 25 can also be explained by considering the fact that if the flaw 50 is of the concave configuration as illustrated, the majority of the light rays will be favorably reflected through focal point 50a towards the fiber 21. As before, each light ray entering along the path of the beam 24 may be reflected several times before finally leaving along the path of the beam 25 and, this fact insures that the maximum amount of light flux will be concentrated at the fiber 21.

In the most favorable case, the edges of the flaw 50 will cause a shadowing effect in the region of the fiber 21 as these edges pass through the light beam 24. This effect can be described as a transition zone where less light is reflected to the fiber 21 than is present in either the case of FIGURE 2 where the light is reflected from the surface 2 or from the case of FIGURE 3 where the light is favorably reflected along the collimated beam 25 into the region of the fiber 21.

Figure 4:
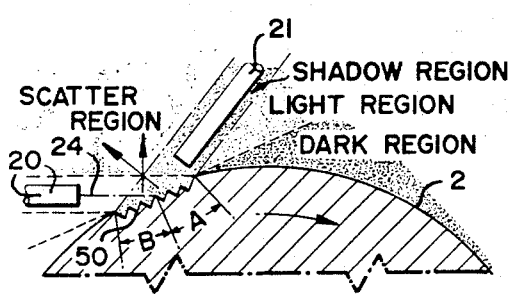
FIGURE 4 is a diagrammatic illustration of the light pattern generated in the present apparatus where a surface flaw has just moved into the field of the light beam.

Referring now to FIGURE 4, the case where the incident light beam 24 has just intersected the flaw 50 during the continuous rotation of the ball 1 as indicated. For purposes of discussion, the surface of the flaw 50 has been divided into sections A and B, and in the case of FIGURE 4 the light beam 24 is assumed to be projected on section A of the flaw 50 and the portion of the surface 2 immediately to the right of said section A, as indicated by the dotted line projection of said beam 24. The interception of half of the collimated incident beam 24 via section A of the flaw 50, creates a reduction in the reflected light of the fan-shaped light region, in a particular manner, as shown. Thus, a shadow region is now created in the fiber 21 causing an immediate and pronounced reduction in light received by the fiber 21. This shadow region is a result of the section A scattering its light into a new region indicated by the crossed arrows, which light was previously reflected into the fiber 21 before the flaw 50 was intercepted, as illustrated in FIGURE 2.

As the ball 1 continues to rotate in the clockwise direction, the collimated light beam 24 completely intersects the sections A and B of the bottom of the flaw 50, as indicated in the discussion of FIGURE 3. In this case, it will be remembered that the light beam 24 is favorably scattered by the generally concave configuration of the flaw 50 and, in accordance with well known phenomena, concentrated by multiple scattering through the focal point 50a so that a substantial amount of the light energy is received by fiber 21, which as will be seen later, represents a substantial increase in energy over the two other incidents related above. In comparing the cases of FIGURES 3 and 4, it can be seen that the amount of light received goes from a minimum in FIGURE 4 where the fiber 21 is located in a shadow region to a maximum in FIGURE 3 where the reflected light beam 25 is concentrated at the fiber 21 by the generally concave flaw 50.

Figure 5:
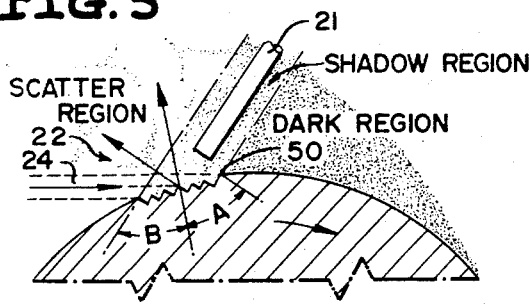
FIGURE 5 is a diagrammatic illustration of the light pattern generated in the present apparatus when the flaw is about to move ouside the range of the light beam.

The final sequence in the move of flaw 50 past the inspection station 22 is illustrated in FIGURE 5, wherein the fiber 21 is again located in a shadow region caused by the further rotation of the ball 1. In this case, the section B of the flaw 50 does not receive light from the light beam 24 since the trailing edge hides this section from the rays of light entering from the left as illustrated. The light rays falling on section A are directed in a random manner to the scatter region to the left of the fiber 21, also as clearly shown in the figure. Thus, in this position, the fiber 21, which is at this point opposite section B of the flaw 50, again receives a minimum amount of light as in the case of FIGURE 3, so that the light energy conveyed to the monitor 30 is again reduced to a minimum.

The shadowing effect described with respect to FIGURES 4 and 5 is more pronounced in the larger and deeper flaws since the leading and trailing edges in these flaws tend to shadow or unfavorably scatter more of the light rays, and thus cause a larger reduction in the amount of energy detected at the fiber optic 21. However, even in flaws of minute size, as the light beam sweeps across the flaw there is a transition zone with less reflected light on each side of the flaw because of the unfavorable scattering of light in the vicinity of the apices of these edges as described.

This action just described with reference to FIGURES 2-5 produces an electrical output through the monitor 30 which can be observed by following a signal trace 51 on the oscilloscope screen 31, as shown in FIGURE 6. The initial portion of the trace 51 represents the passage of the relatively smooth surface past the inspection station 22, as illustrated in FIGURE 2. The initial up and down movement of the signal trace 51 is referred to as the noise level since it is constantly present as the light is intercepted by the surface 2 and reflected to the fiber element 21. Once the flaw 50 comes into range of the incident light beam 24, the signal immediately rises to a point forming pulse 52 which indicates a reduction in light and illustrates the case of FIGURE 4, described above. As the ball 1 continues to rotate to the position of FIGURE 3, the signal trace 51 peaks in the opposite direction at pulse 53, which indicates a large increase in the amount of light received by the fiber 21. Then the shadow region of FIGURE 5 causes a signal trace 51 to once again peak in the opposite direction at pulse 54 due to the reappearance of a shadow region, as explained above. After the flaw 50 has passed the inspect station 22, the signal trace immediately returns to the background noise level as indicated. As a result of the large change in the light received by the fiber 21, as illustrated by the fall of the signal trace from the peaks of pulses 52 and 53 and back to the peak of pulse 54, the flaw 50 is easily detected and interpreted as a flaw whereby the ball 1 can advantageously be rejected.

From the foregoing, it follows that an essential feature of the present invention resides in the fact that a signal with a very large amplitude can be obtained from any size flaw desired by using a fiber optic 21 that is appropriate to the size of the flaw 50 to be detected at a distance from the surface that is also appropriate. This scheme of causing a sequence of shadowing and reflecting by the flaw 50 clearly gives results and advantages not obtainable in the prior art which relies on the random dispersal of the light rays to cause a single reduction in light at the receiving means. For example, the signal to noise ratio is greatly enhanced by this arrangement, thereby making it easier to discriminate against those flaws which are too small to be detected by the simple adjustment of the variable resistor 38 of the electronic monitor 30. In other words, the sensitivity of the apparatus of the present invention is greatly enhanced by the fact that the receiving fiber 21 positioned adjacent the surface 2 is substantially the same size as the flaw being detected, so that a large change in light is detectable and is not lost in the general light level.

In the example described, this has been accomplished by positioning the fiber optic elements 20 and 21 at an angle of incidence $\theta$ so that during the passage of the flaw 50 through the inspection station 22, the receiving fiber 21 receives first a reduction in energy caused by the shadow region of FIGURE 4, then an increase in energy caused by the concentration of light in FIGURE 3, and another reduction in light caused by the shadow region of FIGURE 5, all in sequence.

The foregoing discussion has related generally to the detection of the common recessed flaw 50; however, it is to be understood that with the proper positioning of the fiber elements 20, 21 and the proper adjustment of the supporting electronics, other types of flaws can be easily detected with the apparatus of the present invention. For example, any buildup of material on the surface 2 has been found to cause a shadowing effect similar to that experienced with the flaw edges of FIGURES 2-6 so that an output signal similar to the pulses 52, 54 is capable of being detected in the practice of the invention. Thus, it is apparent that another advantage of the arrangement of the present invention illustrated in FIGURES 2-6, is that flaws that cause a reduction in light can be detected with essentially the same set-up as is used to detect flaws that by their nature cause an increase in light. In either case, the signal that is received is improved over what was previously possible by selection of the fiber element 21 that is appropriate in size and location to the flaw being detected.

Figure 7:
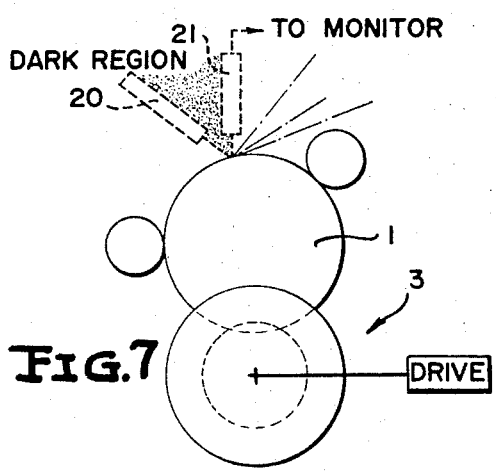
FIGURE 7 illustrates a possible modification of the arrangement of the light receiving component of the device of the present invention.

As illustrated in FIGURE 7, alternate arrangements of the optic elements 20, 21 are possible (note dotted lines outlines). These alternate arrangements may be preferred for different types of flaws and, in some cases, give improved signal to noise ratios. One particular advantage of this arrangement of FIGURE 7 is that the receiving optic fiber 21 is normally located in the dark region when no flaw is detected, that is when surface 2 is in view. In this case, the noise level illustrated in FIGURE 6 is reduced. When a flaw is detected, light is favorably scattered toward the fiber optic 21, as illustrated by the arrows in the figure, and an output signal is generated.

Figure 8:
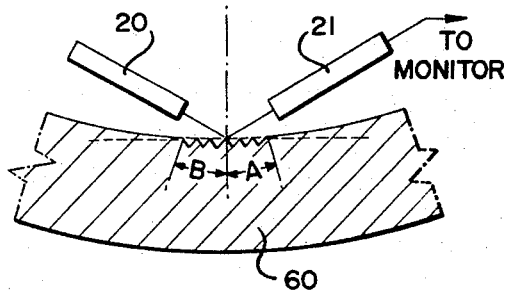
FIGURE 8 illustrates the use of the present invention to inspect a different configuration.

FIGURE 8 illustrates the manner in which the present invention is used in inspecting other types of surfaces, such as a bearing race 60. The operation is the same as described above in relation to the ball 1 and thus need not be explained in detail. It is pointed out that the improved signal to noise ratio can be expected from the race 60 as in the case of the ball 1 just described because of the favorable scattering of light by the flaw and the shadow regions caused by the flaw edges. Generally, the sharper the concave curvature or the gentler the convex curvature of the surface to be inspected, the greater the effect the flaw walls are in shadowing. These increased shadow regions in turn cause the points 52 and 54 of the signal tract 51 to deflect further above the average level so that an improved differential light signal; that is, between points 52, 54 and point 53 of a signal trace, is obtained.

Figure 9:
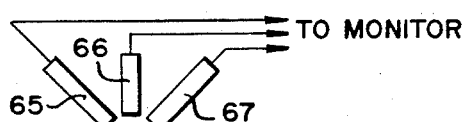
FIGURE 9 illustrates a configuration of the present invention utilizing multiple receiving means.
Figure 9:
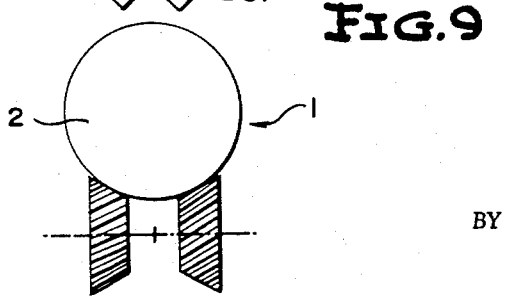

If desired, a plural number of fibers 65, 66, 67 can be provided above the ball 1 whose surface is to be inspected, as illustrated in FIGURE 9. With this arrangement, it is possible to scan the total surface more quickly or provide a measure of redundancy in the detection process to insure that each flaw of the desired size is covered by the scanning process. Also, with this arrangement, it is possible to detect and inspect several different size flaws at one time in a tandem manner by making the fibers 65–67 of different sizes, each one appropriate to the size flaw being detected, bearing in mind, however, that one flaw detector constructed in accordance with the present invention can itself detect flaws over a limited range by adjustment of the supporting electronics, as previously explained.

Refinements of the present invention will be apparent to those skilled in this art. For example, by differentiating the leading portion of the pulse 52 (FIGURE 6) and the trailing portion of pulse 54, the actual width of the flaw can be positively interpreted, since, as will be remembered, the shadowing causing these pulses occurs at the leading and trailing edges of the flaw 50. Also, a group of small flaws can be successfully examined by providing electronics and the appropriate size fiber that are responsive to the occurrence of a group of flaws normally too small to be discriminated against but which when occurring in a group should cause rejection of the component being inspected.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An inspecting device for detecting flaws in a surface wherein said flaws correspond substantially to a predetermined width comprising an energy source for directing a beam of energy into intercepting relation with said surface, means adjacent said surface for receiving said energy after interception by said surface, said energy receiving means having a field of reception substantially the same width as said predetermined width of said flaw and being disposed so that the received energy increases sharply whenever said beam of energy is directed towards a flaw in said surface, and means responsive to said energy receiving means for indicating the energy level received.

2. The combination according to claim 1 wherein said energy receiving means is positioned substantially one field of reception width away from said surface.

3. The combination according to claim 2 wherein the energy directed from said energy source is a collimated light beam.

4. The combination of claim 3 wherein said energy receiving means is a fiber optic element.

5. The combination of claim 1 wherein said energy receiving means is placed so as to be illuminated when no flaw is present.

6. The combination of claim 1 wherein said energy receiving means is placed so as not to be illuminated when no flaw is present.

7. The combination of claim 1 wherein a plurality of said energy sources and energy receiving means are present.

8. A device for detecting flaws in a surface wherein the smallest flaw to be detected has a predetermined size as measured along said surface, said device comprising:
   light source means for directing a collimated beam of light toward said surface,
   light receiving means disposed adjacent said surface for receiving light from collimated beam after reflection from said surface, said light receiving means having a field of view with at least one dimension substantially the same size as said predetermined size and being positioned such that the intensity of the received light increases sharply in response to illumination of a flaw in said surface by said beam of light;
   means responsive to light received by said light receiving means for indicating the intensity of light received.

9. The device according to claim 8 wherein said light receiving means is disposed so as to be illuminated by reflected light from said surface when no flaw is illuminated by said collimated beam of light and such that the intensity of the light received by said light receiving means is first reduced then sharply increased and finally reduced as a flaw in said surface traverses the path of said collimated beam of light.

10. The device according to claim 8 wherein said light receiving means is disposed so as to receive no illumination when no flaw is disposed in the path of said collimated beam of light, and such that reflected light of high intensity is received by said light receiving means when a flaw in said surface traverses the path of said collimated beam of light.

11. The device according to claim 8 wherein said light receiving means is positioned a distance from said surface which is approximately equal to said predetermined size.

12. The device according to claim 8 wherein said light receiving means is a fiber optic element.

13. A device for detecting flaws in a surface which is in motion relative to said device wherein the smallest flaw to be detected has a predetermined size as measured along said surface, said device comprising:
   light source means for directing a collimated beam of light toward said surface;
   light receiving means having a receiving area with at least one dimension of substantially the same size as said predetermined size, said light receiving means being disposed to receive said collimated beam of light after it impinges on said surface and located at a distance from said surface such that the intensity of substantially all of the light received by said light receiving means is modified in response to the passage of a flaw in said surface through said collimated beam of light; and
   means responsive to light received by said light receiving means to provide an indication of the intensity thereof.

14. The combination according to claim 13 wherein said light receiving means is an optical fiber disposed to receive light of said collimated beam reflected from said surface.

References Cited

UNITED STATES PATENTS

| | | | |
|---|---|---|---|
| 3,330,963 | 7/1967 | O'Connor | 250—227 |
| 3,355,014 | 11/1967 | Howles | 250—224 X |
| 2,701,055 | 2/1955 | Strom. | |
| 2,803,161 | 8/1957 | Summerhayes. | |
| 2,857,800 | 10/1958 | Stevens. | |
| 2,947,212 | 8/1960 | Woods. | |
| 3,112,360 | 11/1963 | Gregg | 250—227 X |
| 3,235,740 | 2/1966 | Rottmann. | |
| 3,240,106 | 3/1966 | Hicks | 250—227 X |
| 3,245,158 | 4/1966 | Schwartz | 250—227 X |
| 3,255,357 | 6/1966 | Kapany et al. | 250—227 |

RALPH G. NILSON, *Primary Examiner.*

M. A. LEAVITT, *Assistant Examiner.*

U.S. Cl. X.R.

250—227; 88—14